Figure 4:
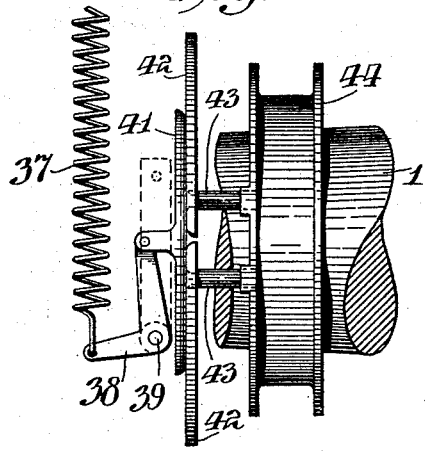

No. 750,498. PATENTED JAN. 26, 1904.
E. A. SPERRY.
POWER TRANSMITTING MECHANISM.
APPLICATION FILED MAR. 5, 1903.
NO MODEL. 4 SHEETS—SHEET 1.
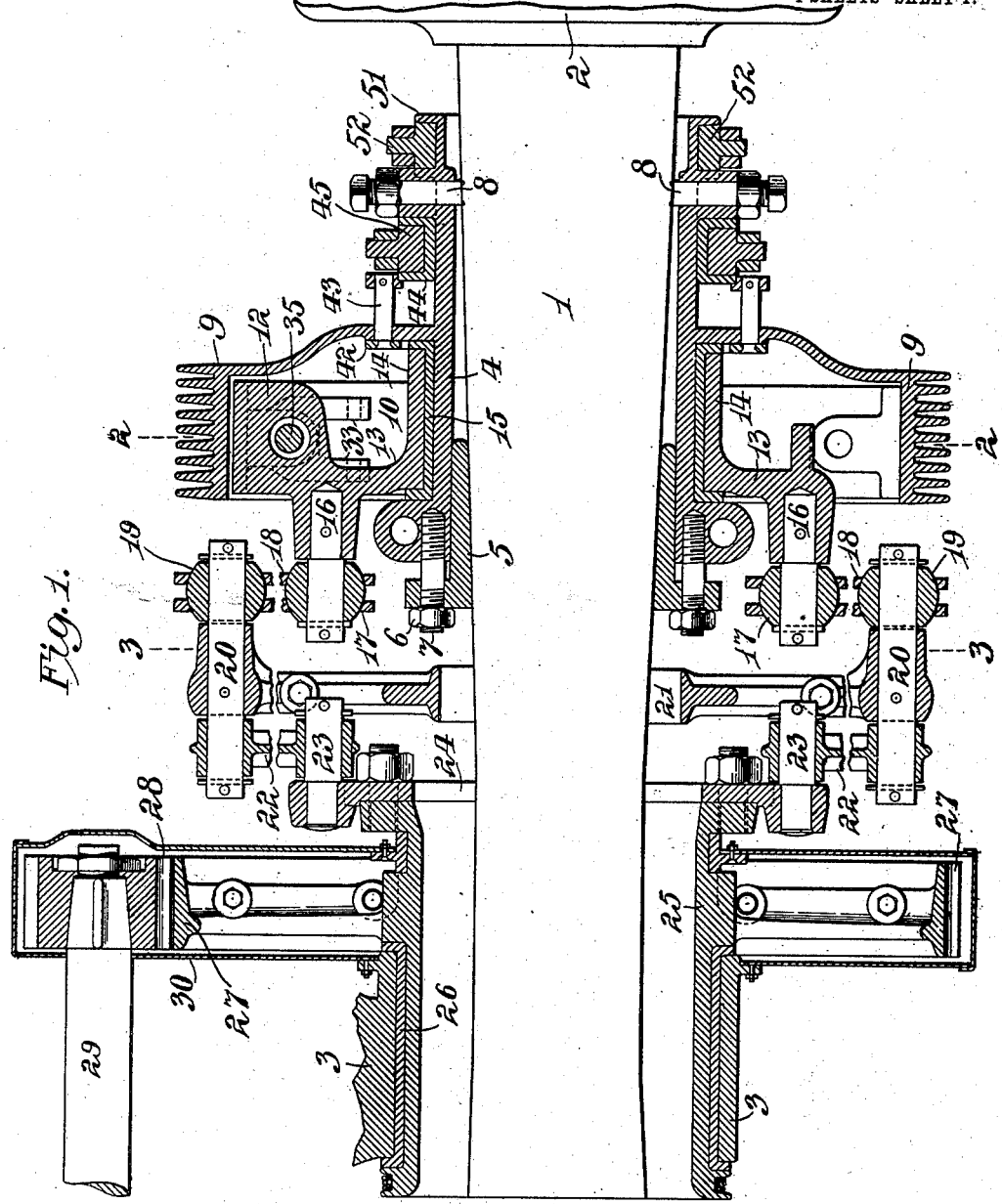

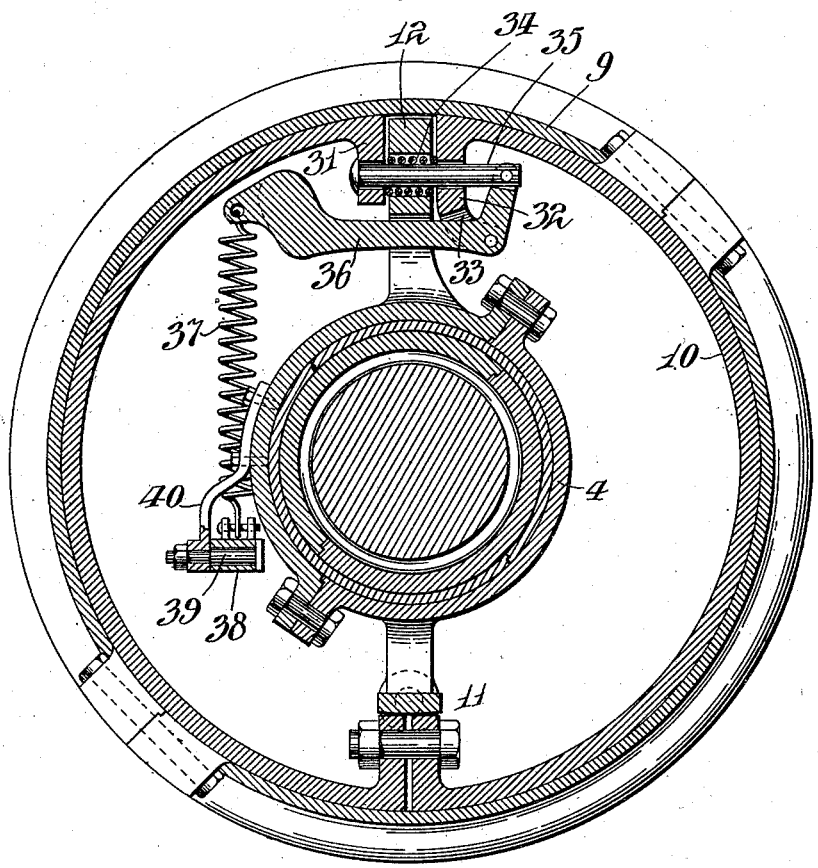

No. 750,498. PATENTED JAN. 26, 1904.
E. A. SPERRY.
POWER TRANSMITTING MECHANISM.
APPLICATION FILED MAR. 5, 1903.
NO MODEL. 4 SHEETS—SHEET 3.

No. 750,498.

Patented January 26, 1904.

UNITED STATES PATENT OFFICE.

ELMER A. SPERRY, OF CLEVELAND, OHIO, ASSIGNOR TO NATIONAL BATTERY COMPANY, OF JERSEY CITY, NEW JERSEY, AND BUFFALO, NEW YORK, A CORPORATION OF NEW JERSEY.

POWER-TRANSMITTING MECHANISM.

SPECIFICATION forming part of Letters Patent No. 750,498, dated January 26, 1904.

Application filed March 5, 1903. Serial No. 146,280. (No model.)

*To all whom it may concern:*

Be it known that I, ELMER A. SPERRY, a citizen of the United States, residing in Cleveland, in the county of Cuyahoga, in the State of Ohio, have invented certain new and useful Improvements in Power-Transmitting Mechanism, of which the following is a specification, reference being had to the accompanying drawings, forming a part hereof.

The present improvements in power-transmitting mechanism are capable of application to different specific uses, although they have been developed with especial reference to their application to electric car-lighting systems in which the power to drive the generator is derived from the car-axle. Since the invention in this as in other cases can be most readily comprehended and appreciated if the difficulties primarily sought to be overcome are first understood, brief reference will be made in the outset to the peculiar conditions which obtain in car-lighting systems in which power is derived from the axle of the car. In the first place it must be borne in mind that the car-axle represents a variable-speed power source, while the generator must be driven at a substantially uniform speed, so that provision must be made for more or less constant variation in speed transmission. It has been sought heretofore to meet this requirement by belt transmission, with provision for regulation of the slip of the belt; but experience has demonstrated that this device is inadequate because of the frequent giving out of the belts aside from the necessity for the use of complicated and troublesome means to offset the constant change of alinement of the axle within the swiveling truck with respect to the car-body, upon which the generator is usually mounted. Even when it has been sought to mount the generator upon the truck itself new difficulties have arisen through the unsymmetrical disposition of the weights upon the truck. Again, the necessity for the reversal of the direction of movement of the car, and consequently of rotation of the axle, introduces another factor to be reckoned with. It is obviously desirable that the transmitting devices, with all the appurtenances necessary to provide for variation in speed transmission and for reversal of movement, should be located as nearly as possible concentric with the car-axle; but as these devices, or some of them, are as a practical necessity supported upon or connected with the truck itself provision must also be made to accommodate the dancing of the axle with respect to the truck-frame and the endwise floating movement of the axle with respect to the truck-frame. Even then the sensitive moving parts should be statically balanced as nearly as possible in order that they shall not respond to the vibrations and irregular movements of the parts with which they are connected. All parts, moreover, should be so housed and protected that they shall not be affected by the severe conditions of dirt and moisture to which they would be subjected otherwise in their place on the truck of a rapidly-moving car.

It has been sought in the present invention to meet all of the requirements which are thus briefly indicated; but it will nevertheless be obvious not only that the complete transmitting mechanism hereinafter described is capable of application to other uses than that particularly referred to, but that parts of the mechanism are also capable of use by themselves or in other combinations, as the peculiar conditions of each use may require.

Figure 3:
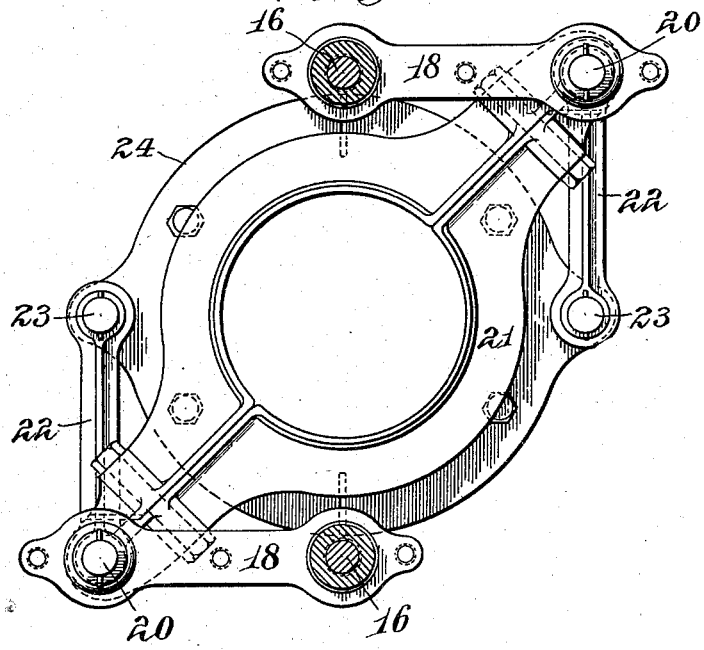
Figure 5:
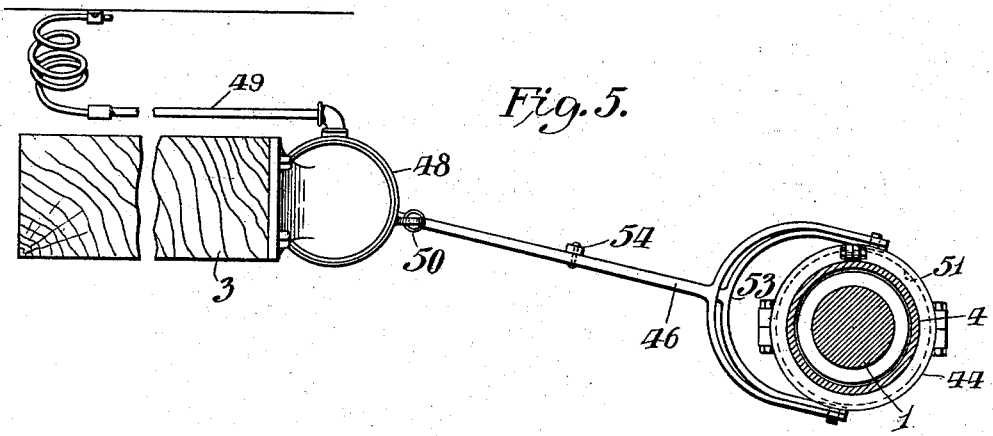
Figure 6:
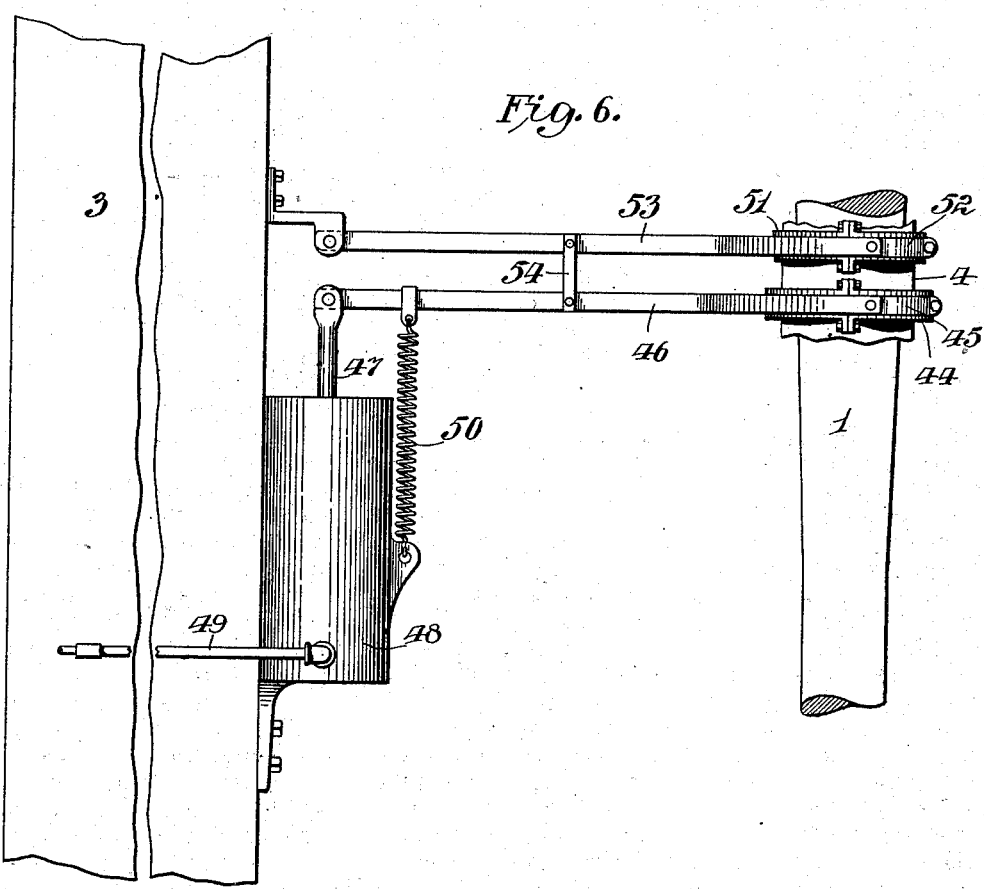

In the accompanying drawings, wherein for purposes of illustration and explanation of the nature of the invention is shown a convenient and practical embodiment of the invention, Figure 1 is a view in central longitudinal section of the improved transmitting mechanism, the parts at the left of the median line being shown in section on a plane at right angles to the plane of section of the parts at the right of the median line in order that all of the parts may be shown in this view, while portions of a car axle and wheel and truck-frame are shown. Fig. 2 is a view in transverse section on the plane indicated by the line 2 2 of Fig. 1 looking toward the left. Fig. 3 is a view in transverse section on the plane indicated by the line 3 3 of Fig. 1 looking toward the left. Fig. 4 is a detail view in side elevation showing a portion of the devices for adjusting the tension of the spring which controls the engagement of the slip friction devices. Figs. 5 and 6 are detail views, on a smaller scale, of other portions of the devices for adjusting the tension of the spring last referred to, Fig. 5 being an end view with the axle in section and Fig. 6 being a plan view.

In a particular embodiment of the invention which is illustrated in the accompanying drawings a portion of a car-axle is represented at 1, a portion of one of the car-wheels at 2, and a portion of the truck-frame at 3, in Figs. 1, 5, and 6. These parts are represented in the drawings to illustrate the relation of parts of the transmission mechanism thereto and of course might be replaced by anything else which stands for the source of power or the supporting-framework. The axle is represented as tapered, as usual, and for the purpose of supporting thereon and securing thereto those parts of the transmission mechanism which are immediately related to the axle a split sleeve 4 is adapted to be clamped about the axle and to be securely fastened thereto by a split annular wedge 5, adapted to be driven up by nuts on bolt 7 and by set-screws 8 at the other end of the sleeve. Carried by the sleeve 4 and preferably integral therewith is an internal friction-wheel 9, suitably formed exteriorly for the rapid dissipation by radiation of the heat which may be developed by friction. Either this internal friction-wheel, which is rigidly secured to the axle, or the axle itself may be considered as the element of the transmission mechanism which represents the source of power and in the particular instance under consideration has a variable speed. Interior to the friction-wheel 9 is an expansible friction-ring 10. (Shown in Figs. 1 and 2.) This may be conveniently formed in two parts bolted together at one point, as at 11, as shown in Fig. 2. It is not anchored at any point to a carrier, but is free throughout its length and embraces between its free ends and drives a lug or abutment 12 on a carrier 13, which is mounted, with a suitable hub 14, on the sleeve 4, a suitable journal-brass 15 being interposed between the hub and the sleeve.

Before describing the means for regulating the frictional engagement between the expansible ring 10 and the internal friction-wheel 9 the devices by which power is transmitted from the carrier 13 to the driven part will be described, and in order that these devices may be clearly understood it should be borne in mind that they are so devised as to accommodate not only the dancing of the car-axle or driver with respect to the truck-frame or the driven part which is mounted thereon, but also the endwise floating movement of the axle or driver with respect to the truck-frame or driven part. Secured to the carrier 13 at diametrically opposite points are pins 16, (shown in Figs. 1 and 3,) and upon these pins 16 are mounted, by means of universal or ball joints 17, links 18, which at their remote ends are mounted, by means of universal or ball joints 19, upon pins 20, which are carried at diametrically opposite points by a floating ring or frame 21, which surrounds loosely the axle 1, being conveniently formed in two parts, which are bolted together, as shown in Fig. 3. The links 18 may be conveniently made double to embrace the balls at 17 and 19, upon which they bear, the balls themselves being supported upon the pins 16 and 20. Upon the opposite ends of the pins 20 are hung links 22, which at their free ends engage pins 23, carried by a ring 24, which is secured to the end of a sleeve 25. The latter loosely encircles the axle 1, being conveniently formed in two parts, and has a bearing, as at 26, within the truck-frame 3. The sleeve 26 may be formed with the gear 27, which in the particular application of the invention contemplated may mesh with a pinion 28 on the end of the armature-shaft 29 of the generator, the gears being completely inclosed and protected from dust, stones, mud, &c., by a casing 30, which is carried by the truck-frame. It will be understood upon an inspection of Fig. 3 that any vertical movement of the axle with respect to the truck-frame will be accommodated by the links 18 without being permitted to affect any other of the moving parts, that any lateral movement of the axle with respect to the truck-frame will in like manner be accommodated by the links 22, and that any movement of the axle in any intermediate direction will be accommodated by the links 18 and 22 together. Furthermore, upon reference to Fig. 1 it will be understood that the universal or ball joints 17 and 19, by which the links 18 are mounted upon the pins 16 and 20, will accommodate the endwise floating movement of the axle with respect to the truck-frame, also without permitting the action of any other of the moving parts to be affected.

The floating ring or frame 21 and its associated parts thus provide a connection between the driver and the driven part which is at once positive and universal, insuring transmission of power from one to the other without waste by friction in the transmitting devices and permitting complete freedom of relative movement between the driver and the driven part both in the line of the common axis and in directions at right angles therewith. The means for controlling the transmission of speed, so that the driven part may have a uniform speed independent of variations in the speed of the driver, will now be described.

The expansible ring 10 is formed at its ends on opposite sides of the lug 12 with heads 31 32, the latter having ears 33, as shown in Figs. 1 and 2. A spring 34, seated in the lug 12, tends to spread the ends of the ring and to expand the ring against the internal friction-surface of the wheel 9, and thus to secure a driving action. A bolt 35, headed at one end, passes through the two heads 31 32 and is engaged by a bell-crank lever 36, which is pivoted between the ears 33, the longer arm of the bell-crank lever being weighted and so placed with respect to the bolt 35 that the centrifugal action of the weight when the speed of revolution increases tends to draw together the ends of the expansible friction-ring 10 against the tension of the spring 34, and thereby to reduce the friction between the expansible ring and the friction-surface of the wheel 9, which as between these two parts is the driving element of the friction transmission device, and therefore to reduce the speed of revolution of the expansible ring, which is the driven element. It will be observed that as the weighted lever 36 is carried by the driven element the reduction of speed of the driven part itself diminishes the centrifugal action of the weight, so that too great a reduction in the speed of revolution of the expansible ring is prevented. A slight increase of speed of the driven element, moreover, serves to reduce instantly the frictional engagement. It follows, therefore, between these two tendencies that the speed of the driven element becomes practically uniform regardless of variations in the speed of the driver above a predetermined minimum. Furthermore, it will be observed that by making the expansible ring entirely free—that is, without anchoring it at any point—a single ring acquires what may be called a "double snubbing-post" action and serves the purposes of the two oppositely-acting friction devices which are usually required when revolution in either direction is to be provided for. The expanding ring, it will be observed, is pushed around by the friction-surface 9 against the lug 12, which it drives, and the direction of movement of the driving element with respect to the free end of the expansible ring is such as to tend by reason of its frictional engagement with such free end to move the free end farther in the direction of expansion, and thereby to increase the frictional engagement. This fact, coupled with the further fact that the entire ring is free, not only secures perfect contact throughout the entire circle, but relieves the necessity of providing powerful expanding devices between the two ends of the ring, such as are usually employed. In order that the action of the expanding ring, as herein described, may be untrammeled, care should be taken that the contracting-bolt 35, the bell-crank 36, and the expanding spring 34 all move freely with the expanding ring and independently of the part driven by it.

It will be understood, of course, that the centrifugal action of the weighted bell-crank 36 is counterbalanced to some extent, as by a suitable spring 37, which is connected at one end with the weighted end of the bell-crank 36. In some cases—as, for example, in a car-lighting system, where it becomes desirable to provide for a variation of the electromotive force during generation—it is desirable to provide for a variation in the speed of the driven element of the transmission mechanism. This is most easily accomplished in the present instance by varying the tension of the spring 37, which controls the centrifugal action of the weighted lever 36, and consequently the frictional engagement between the driving element 9 and the driven element 10. Accordingly the end of the spring 37, as shown in Figs. 2 and 4, is connected to one end of a bell-crank lever 38, which is mounted upon a pin 39, carried by a bracket 40, which is secured in turn to the hub 14 of the carrier 13. The other end of the bell-crank 38 is connected to a shoe 41, which rides against the lateral face of a two-part ring 42. Each part of the ring 42 is carried by pins 43, as shown in Figs. 1 and 4, the pins 43 projecting through the web which carries the friction driving member 9 from a channeled ring 44, which is mounted to move longitudinally on the sleeve 4. The channeled ring 44 is embraced by a split ring 45, which is engaged by the forked end of a lever 46, as shown in Figs. 5 and 6. The opposite end of the lever 46 is connected to means for shifting it, such as the piston-rod 47 of a cylinder 48, mounted on the truck-frame 3, to which fluid under pressure may be admitted from a suitable source, sufficiently represented by the pipe 49, to shift the lever against the tension of a spring 50. A second circumferential channel 51 is formed in or carried by the sleeve 4, so that it shall partake of the endwise floating movement of the axle 1. It is embraced in turn by a split ring 52, which is engaged by the forked end of a lever 53, the other end of which is pivoted upon the truck-frame 3 or other part with reference to which the endwise floating movement of the axle 1 takes place. The two levers 46 and 53 are pivotally connected with each other, as by means of a link 54. It will be readily seen that if the axle 1 is assumed to be stationary with respect to truck-frame 3 any movement of the piston-rod 47 will act through the lever 46, the sliding ring 44, the pins 43, the two-part ring 42, the shoe 41, and the bell-crank lever 38 to vary the tension of the spring 37, and therefore to vary the frictional engagement between the driving element 9 and the driven element 10, and consequently the speed of the latter. Under actual conditions of operation, however, the axle 1 is almost constantly in motion endwise with respect to the truck-frame, and it will be evident that such endwise movement must in some way be compensated for in order that it may not of itself affect the tension of the spring 37. To accomplish this, the fulcrum of the lever 46 is shifted to correspond with every change in position of the axle-fork by pivotally connecting it with the lever 53, which moves with the axle in its endwise floating movement. Thus any movement of the axle to the right with respect to the end of the piston-rod 47, to which the lever 46 is pivoted, moves the forked end of the lever 53 which engages the relatively fixed circumferential channel 51 also to the right. Through the connection of the levers 53 and 46 the lever 46 is also moved to the right and the channeled ring 44 with it. Thus the channeled ring 44 and its connections are moved always in the same direction and to the same extent as the relatively fixed channel 51 by the endwise floating movement of the axle, and yet the channeled ring 44 and its connections are free to be moved relatively to the axle 1 by the movement of the piston 47. The devices for varying the tension of the spring 37 are therefore always exactly responsible to their controlling means and are unaffected by the endwise floating movement of the axle. The levers 46 and 53 and their connections are so located and such provision for freedom of movement is made that the operation of these parts is not affected by the dancing movements of the axle with respect to the truck-frame.

I claim as my invention—

1. A power-transmission mechanism for axle-driven electric car-lighting systems, &c., comprising a driver and a driven part movable relatively to each other both in the direction of the axis and transversely and concentrically mounted, and a universal coupling between the driver and the driven part.

2. A power-transmission mechanism for axle-driven electric car-lighting systems, &c., comprising a driver and a driven part movable relatively to each other both in the direction of the axis and transversely and concentrically mounted, and a universal coupling comprising a floating frame and links connecting the frame on each side with the driver and the driven part respectively.

3. A power-transmission mechanism for axle-driven electric car-lighting systems, &c., comprising a driver and a driven part movable relatively to each other in the direction of the axis and concentrically mounted, and a coupling comprising links connected by ball or universal joints at each end with the driver and driven part respectively.

4. The combination with a car-axle and a truck-frame, of a driver secured to the axle to move therewith, a driven part mounted upon the truck-frame concentrically with the axle, and a universal coupling between the driver and the driven part.

5. The combination with a car-axle and a truck-frame, of a driver secured to the axle to move therewith, a driven part mounted upon the truck-frame concentrically with the axle, and a coupling comprising links connected by ball or universal joints at each end with the driver and the driven part respectively.

6. The combination of a car-axle and a truck-frame, of a driver secured to the axle to move therewith, a driven part mounted upon the truck-frame concentrically with the axle, and a coupling comprising a floating frame and links connecting the frame with the driver and the driven part respectively and relatively disposed substantially at right angles.

7. A power-transmission mechanism for axle-driven electric car-lighting systems, &c., comprising a variable-speed power source, a driven part, a friction transmitting device and a coupling between the friction transmitting device and the driven part and comprising a floating frame and links connecting the frame with the friction transmitting device and the driven part respectively and relatively disposed substantially at right angles.

8. The combination with a car-axle and a truck-frame, of a friction transmitting device mounted upon the axle to move therewith, a driven part mounted on the truck-frame concentrically with the axle, and a coupling comprising links connected by ball or universal joints at each end with the friction transmitting device and the driven part respectively.

9. The combination with a car-axle and a truck-frame, of a friction transmitting device mounted upon the axle to move therewith, a driven part mounted on the truck-frame concentrically with the axle, and a coupling comprising a floating frame and links connecting the frame with the friction transmitting device and the driven part respectively and relatively disposed substantially at right angles.

10. A power-transmission mechanism for axle-driven electric car-lighting systems, &c., comprising a variable-speed power source, a driven part, a friction-wheel carried with the power source, an expansible ring coöperating with the friction-wheel and free from end to end and an abutment connected with the driven part and interposed between the ends of the expansible ring.

11. A power-transmission mechanism for axle-driven electric car-lighting systems, &c., comprising a variable-speed power source, a friction-wheel carried with the power source, an expansible ring coöperating with the friction-wheel and free from end to end, a carrier having a lug interposed between the ends of the expansible ring and a driven part operatively connected to said carrier.

12. A combination with a car-axle and a part to be driven therefrom of a friction-wheel carried with the axle, an expansible ring coöperating with the friction-wheel and free from end to end, and an abutment connected with the driven part and interposed between the ends of the expansible ring.

13. The combination with a car-axle and a driven part mounted concentrically with the axle, of a friction-wheel carried with the axle, an expansible ring coöperating with the friction-wheel and free from end to end, and a carrier connected with the driven part and having a lug interposed between the ends of the expansible ring.

14. A power-transmission mechanism for axle-driven electric car-lighting systems, &c., comprising a variable-speed power source, a friction-wheel carried with the power source, an expansible ring coöperating with the friction-wheel, a weighted, centrifugal lever carried by the expansible ring and operatively connected with the ends thereof to control the expansion of the ring, and a driven part in operative relation with the expansible ring.

15. A power-transmission mechanism for axle-driven electric car-lighting systems, &c., comprising a variable-speed power source, a friction-wheel carried with the power source, an expansible ring coöperating with the friction-wheel, a weighted, centrifugal lever pivoted on one end of the expansible ring, a headed bolt engaging the other end of the expansible ring and the weighted lever, and a driven part in operative relation with the expansible ring.

16. A power-transmission mechanism for axle-driven electric car-lighting systems, &c., comprising a variable-speed power source, a friction-wheel carried with the power source, an expansible ring coöperating with the friction-wheel, a spring acting to separate the ends of the expansible ring, a weighted, centrifugal lever carried by the expansible ring and acting upon the ends of the expansible ring in opposition to the spring, and a driven part in operative relation with the expansible ring.

17. The combination with a car-axle and a part to be driven therefrom, of a friction-wheel carried with the car-axle, an expansible ring coöperating with the friction-wheel and operatively connected with the driven part, and a weighted, centrifugal lever carried by the expansible ring and operatively connected with the ends thereof to control the expansion of the ring.

18. The combination with a car-axle and a part to be driven therefrom, of a friction-wheel carried with the car-axle, an expansible ring coöperating with the friction-wheel, a carrier operatively connected with the driven part and having a lug interposed between the ends of the expansible ring, and a weighted, centrifugal lever carried by the expansible ring and operatively connected with the ends thereof to control the expansion of the ring.

19. A power-transmission mechanism for axle-driven electric car-lighting systems, &c., comprising a variable-speed power source, a friction-wheel carried with the power source, an expansible ring coöperating with the friction-wheel and operatively connected with the driven part, a weighted, centrifugal lever carried by the expansible ring and operatively connected with the ends thereof to control the expansion of the ring, a spring connected with the centrifugal lever to oppose the centrifugal action thereof, and means to vary the tension of the spring.

20. A power-transmission mechanism for axle-driven electric car-lighting systems, &c., comprising a variable-speed power source, a friction-wheel carried with the power source, an expansible ring coöperating with the friction-wheel, a weighted, centrifugal lever carried by the expansible ring and operatively connected with the ends thereof to control the expansion of the ring, a spring connected with the centrifugal lever to oppose the centrifugal action thereof, a carrier driven by the expansible ring, a second lever mounted upon said carrier and connected to said spring, and means rotating with the friction-ring to act upon said lever and vary the tension of the spring.

21. A power-transmission mechanism for axle-driven electric car-lighting systems, &c., comprising a variable-speed power source, a friction-wheel carried with the power source, an expansible ring coöperating with the friction-wheel, a weighted, centrifugal lever carried by the expansible ring and operatively connected with the ends thereof to control the expansion of the ring, a spring connected with the centrifugal lever to oppose the centrifugal action thereof, a carrier driven by the expansible ring, a second lever mounted on the carrier and connected to said spring, a shoe carried by said second lever, a ring rotating with the friction-wheel and movable in the direction of the axis against said shoe, and means to shift said ring.

22. A power-transmission mechanism for axle-driven electric car-lighting systems, &c., comprising a variable-speed power source, a friction-wheel carried with the power source, an expansible ring coöperating with the friction-wheel, a weighted, centrifugal lever carried by the expansible ring and operatively connected with the ends thereof to control the expansion of the ring, a spring connected with the lever to oppose the centrifugal action thereof, a ring shiftable axially and rotating with the friction-wheel in operative relation with said spring, and means to shift said ring axially to vary the tension of said spring.

23. A power-transmission mechanism for axle-driven electric car-lighting systems, &c., comprising a variable-speed power source having a longitudinal floating movement, a friction transmitting device carried by said variable-speed power source, a lever operated from a relatively fixed frame and connections to vary the frictional engagement of the members of said friction-transmitting device, and means to shift the fulcrum of said lever to correspond with the endwise floating movement of the power source, whereby the action of said lever upon the friction-transmitting device is unaffected by said floating movement of the variable-speed power source.

24. A power-transmission mechanism for axle-driven electric car-lighting systems, &c., comprising a power source having an endwise floating movement, a speed transmitting and controlling device carried with the power source, a lever operated from a relatively fixed point and connections to said speed controlling and transmitting device to control the same, and means to shift the fulcrum of said lever to correspond with the endwise floating movement of the power source, whereby the action of the lever is unaffected by said floating movement of the power source.

25. A power-transmission mechanism for axle-driven electric car-lighting systems, &c., comprising a power source having an endwise floating movement, a regulating device carried with said power source, a lever operated from a relatively fixed point and connections to said regulating device to control the same, and means to shift the fulcrum of said lever to correspond with the endwise floating movement of the power source, whereby the action of the lever is unaffected by said floating movement of the power source.

26. A power-transmission mechanism for axle-driven electric car-lighting systems, &c., comprising a power source having an endwise floating movement, a regulating device carried with the power source, a lever operated from a relatively fixed point and connected to said regulating device to control the same, a second lever having one end connected to the power source to partake of the endwise floating movement, and the other end connected to a relatively fixed point, and a pivotal connection between said levers whereby the fulcrum of the first lever is shifted according to the endwise floating movement of the power source.

27. The combination with a car-axle having an endwise floating movement and a truck-frame, of a regulating device carried with the axle, a lever and connections to said regulating device to control the same, means mounted upon the truck-frame to actuate said lever and means to shift the fulcrum of said lever to correspond with the endwise floating movement of the axle.

28. The combination with a car-axle having an endwise floating movement and a truck-frame, of a regulating device carried with the axle, a lever and connections to said regulating device to control the same, means mounted on the truck-frame to actuate said lever, a second lever having one end connected to the axle to partake of the endwise floating movement and the other end pivotally connected to the truck-frame, and a pivotal connection between said levers.

29. The combination of a car-axle having an endwise floating movement, a power-transmitting and speed-regulating device mounted on the axle, a longitudinally-shiftable ring mounted on the axle and connections to control said power-transmitting and speed-regulating device, a second ring fixed on the axle, a lever engaging the shiftable ring, and means mounted on the axle to actuate said lever, a second lever engaging the fixed ring at one end and pivotally connected to the truck-frame at the other end, and a pivotal connection between said levers.

This specification signed and witnessed this 2d day of March, A. D. 1903.

ELMER A. SPERRY.

In presence of—
ANTHONY N. JESBERA,
W. B. GREELEY.